United States Patent Office 2,870,098
Patented Jan. 20, 1959

2,870,098

PROCESS FOR PREPARING RESINS OF POLYSUBSTITUTED BENZENES

Robert W. Martin, Lafayette, and Fred E. Condo, El Cerrito, Calif., assignors to Shell Development Company, New York, N. Y., a corporation of Delaware No Drawing. Application January 23, 1956
Serial No. 560,864

3 Claims. (Cl. 260—2)

This invention relates to a novel process for the preparation of certain resins. More particularly, it relates to a novel process for preparing resins which may be described as poly-substituted benzene resins.

It is an object of this invention to provide new and efficient processes for preparing resins of poly-substituted benzenes. It is another object of this invention to provide efficient processes for preparing poly-substituted benzene resins of high molecular weight. Other objects will become apparent as the description proceeds.

The process of this invention provides methods for preparing polymers having reoccurring units of the structure

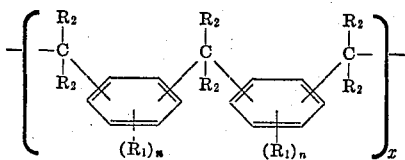

wherein $R_1$ is a saturated aliphatic radical, $R_2$ is selected from hydrogen and lower alkyl, $n$ is an integer selected from 3 and 4 and $x$ indicates an integer greater than 1, which comprises reacting a bis-(alpha-chloroalkyl)poly-substituted benzene and a poly-substituted benzene. The poly-substituted benzene referred to is taken herein to mean only those substitutions which are saturated aliphatic radicals and which have from 3 to 4 such substitutions on each benzene ring. This term also includes homopolymers, copolymers and mixed polymers as well.

As the $R_1$'s in the above formula may be any saturated aliphatic hydrocarbon substituent, a large variety of different polymers may be prepared. The $R_1$'s may be higher aliphatics such as nonadecyl, pentadecyl, decyl, and the like, or they may be lower alkyl such as pentyl, propyl, isopropyl, ethyl, methyl, and the like. If desired, the $R_1$'s on the benzene nucleus may be mixtures of such radicals. The products thus produced are more fully described in copending application, Serial No. 560,876, filed January 23, 1956.

The reaction may be illustrated by the following equation:

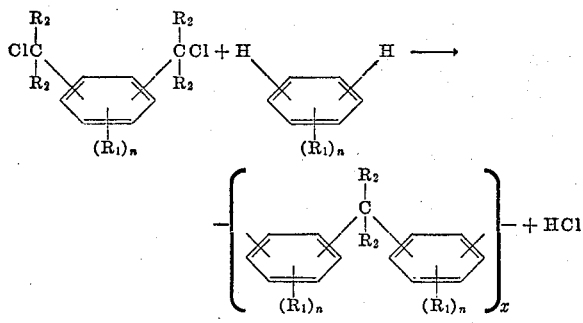

wherein $R_1$, $R_2$, $x$ and $n$ are as previously indicated.

Among the preferred bis-(chloroalkyl)polyaliphatic substituted benzenes are bis-(chloromethyl)durene, bis-(chloromethyl)isodurene, bis-(chloromethyl) prehnitene, 4,5-bis-(chloromethyl)hemimellitene, 3,6-bis-(chloromethyl)pseudocumene, 2,4-bis-(chloromethyl)mesitylene, 1,4-bis-(chloromethyl)trimethylethyl benzene, 1,5-bis-(chloromethyl)1,3,5-triethyl benzene, and the like. It is preferred that $R_2$ be hydrogen although it may be any lower alkyl group up to 8 carbon atoms. It will be found that, as a practical matter, the bis-(alpha-chloroalkyl)-poly-substituted benzenes, other than methyl, do not present feasible products because of the difficulty of preparing them in suitable yields. The bis-(chloromethyl)poly-substituted benzenes are conveniently prepared from a poly-substituted benzene and formaldehyde in the presence of hydrochloric acid. Thus for example, bis-(chloromethyl)durene may be prepared from durene, formaldehyde, and hydrochloric acid.

The preferred poly-substituted benzenes, which constitute the other class of reactants, are represented by compounds such as durene, isodurene, prehnitene, hemimellitene, pseudocumene, mesitylene, trimethyl ethyl benzene, 1,3,5-triethylmethyl benzene, and the like.

From the typical starting materials represented above, resinous products are obtained, for example, from the reaction of bis-(chloromethyl)durene and durene; bis-(chloromethyl)tetraethyl benzene and 1,2,4,5-tetraethyl benzene, and the like. Such products have symmetrical configurations and are characterized by high melting points.

Unsymmetrical resinous products are obtained, for example, by the reaction of bis-(chloromethyl)durene and isodurene, bis-(chloromethyl)durene and the trimethyl benzenes as pseudocumene, bis-(chloromethyl)isodurene and 1,2,3-triethyl benzene, and the like. Other unsymmetrical resinous products may be obtained by the reaction of a plurality of bis-(chloromethyl) compounds and polyaliphatic substituted benzenes as bis-(chloromethyl)-durene, isodurene and prehnitene; bis-(chloromethyl)-durene, prehnitene and mesitylene; bis-(chloromethyl) tetraethyl benzene, durene and 1,3,5-triethylbenzene; bis-(chloromethyl) tetraethylbenzene, hemimellitene and 1,3,5-trimethyl benzene; bis-(chloromethyl)durene, bis-(chloromethyl)tetraethyl benzene, mesitylene and trimethylethyl benzene, and the like. Such unsymmetrical products are characterized by lower melting points than the symmetrical products described above.

The products result from the reaction of one equivalent of the di-(chloroalkyl)polyaliphatic benzene with one equivalent of the poly-substituted benzene. It is preferred however, that the latter be in slight excess of the former as the final product will then be substantially free of chlorine atoms at the end of the polymer chain. The reactants may be in the ratio of from about 1.1 to 1 to about 1:1. Any unreacted material is subsequently removed, as will hereinafter appear.

The reaction is conducted in the presence of a high boiling solvent, that is, one that has a boiling range from about 100° C. to about 250° C. It is found that satisfactory solvents include the aliphatic saturated hydrocarbon of 8 to 13 atoms, or homologues thereof, and various cyclic hydrocarbons such as decalin, cyclooctane, and the like. The high boiling range of the solvent is required in order to complete the reaction within reasonable times. It is found that within the above temperature range, reaction times in the order of 5 to 11 hours may be required. Atmospheric, superatmospheric or subatmospheric pressures may be used as desired. A preferred boiling range is from about 150° C. to 200° C. and the temperature of the reaction should not be permitted to go much above 200° C. until most of the hydrogen chloride, which is formed during the reaction, has formed and escaped.

This usually will require a couple of hours. If pressures other than atmospheric, or thereabout, are used, it will be necessary to bleed-off the hydrogen chloride as it forms.

The rate of the reaction is considerably hastened by the use of catalysts. It is found that the Friedel-Crafts catalysts are particularly suited to this reaction. Such catalysts include aluminum chloride, aluminum bromide, zinc chloride, boron trifluoride, silicon tetrachloride, stannic chloride, stannic bromide, titanium tetrachloride, bismuth trichloride, and the like. The catalyst is used in an amount ranging from as little as 1/100 to 5% of the total weight of the reactants. It is found however that 1% by weight represents a practical maximum, although considerably lesser quantities are usually adequate.

After the reaction is complete, the product is washed to remove unreacted starting materials and any impurities that may have formed. The choice of the wash liquid will vary depending on the solubility of the product which can be approximated by the degree of its symmetry. As a generalization, unreacted starting material may be removed by washing with any of the common organic solvents as methyl, ethyl, isopropyl and tertiary butyl alcohols, or ethers such as diethyl ether, dioxane, and the like, or esters, as methyl or ethyl acetates, or ketones such as acetone or methyl ethyl ketone, and hydrocarbons as benzene and toluene. Stronger wash liquids may be required in some cases in order to remove the catalyst. Thus, it may be necessary to use solutions of mineral acids such as hydrochloric acid, phosphoric acid, and the like. When such is the case, subsequent removal of the acid by neutralization and further washing is desirable. The resinous product thus produced is dried and then ready for use in a molding composition, surface coatings, laminates and the like.

In the following examples which are cited to illustrate the invention but are not intended to limit it in any manner, the quantity of the reactants is expressed in parts by weight.

Example I

To a reaction vessel equipped with a mechanical agitator, thermometer, heating and cooling means, and a reflux condenser are charged 54 parts of decalin, 46 parts of bis-(chloromethyl)durene, 27 parts of durene and .02 part of zinc chloride. The temperature of the mass is slowly raised to 200° C. and held at that temperature with continued agitation for a period of about 14 hours. Hydrogen chloride is evolved rapidly during the early part of the reaction. As the reaction proceeds the rate of hydrogen chloride evolution declines and finally becomes negligible. The mixture is then cooled and added to 20 parts of isopropyl alcohol. After washing for 5 minutes, the mixture is filtered and dried. The product is a brownish color. On boiling in methyl ethyl ketone for 10 minutes, filtering and drying, the product has a tan color and a melting point of about 365° C. A small portion of the product is further purified by boiling in concentrated hydrochloric acid followed by washing with small portions of ammonium hydroxide, water and isopropyl alcohol, respectively. Upon drying the product has a slight tan color and melts at about 360° C. The yield is about 60%. Chlorine content: 0.11%. Carbon: 88.1%. Hydrogen: 9.4%.

Example II

The procedure of Example I is repeated except that the reaction time is reduced to 10 hours. The yield is increased 5% thus indicating that the reaction time of Example I is excessive.

Example III

The procedure of Example I is repeated except that the reaction time is reduced to 8 hours. The yield is considerably lower indicating that the reaction time is too short.

Example IV

To a reaction vessel as in Example I are added 23 parts of bis-(chloromethyl)durene, 13.5 parts of durene, 22.5 parts of decalin and .2 part of ferric oxide. After reacting for 8 hours at 200° C., the reaction mass is washed with 10 parts of isopropyl alcohol, followed by washings with dilute hydrochloric acid, ammonia hydrochloride, water and isopropyl alcohol. Upon drying a light tan product having a melting point of about 340° C. is obtained. Chlorine content: <0.09%.

Example V

The procedure of Example I is repeated except that the following quantities are used:

| | Parts |
|---|---|
| Bis-(chloromethyl)durene | 34.5 |
| Durene | 20.5 |
| Zinc chloride | .1 |
| Decalin | 54.0 |

Upon washing with trichlorobenzene and tetrachloroethane, 76.5% of a yellowish powder having a melting point over 300° C. is obtained. Chlorine content: 0.04%.

Example VI

To a reaction vessel equipped with a mechanical agitator, thermometer, heating and cooling means and a reflux condenser are charged 46 parts of bis-(chloromethyl)durene, 29.6 parts of 5-ethyl pseudocumene, 55 parts of decalin and .1 part of zinc chloride. The temperature of the mixture is raised to 200° C. over a 45 minute period and held at that temperature for 6 hours after which it is cooled to room temperature. After washing for 5 minutes first in boiling isopropyl alcohol and then in boiling methyl ethyl ketone to remove unreacted starting material and low molecular weight polymer, the mixture is filtered and dried. The product, a yellow color, has a melting point of about 250° C. The soluble polymer recovered from the wash liquids has a melting point of about 165° C. Chlorine: 0.03%. Carbon: 89.4%. Hydrogen: 9.6%.

Example VII

An analogous product is obtained by following the procedure of Example VI using 5-ethyl hemimellitene.

The poly-substituted benzenes may be molded into useful parts for the electrical arts as they have improved electrical properties combined with high softening points. The products of this invention may also be applied to insulating tapes for electrical parts.

The conditions under which the products of this invention are molded will vary widely depending on the composition of the particular product and its softening point. This is particularly the case concerning molding temperatures. As a general rule, molding temperatures will be near the softening point of the resin. Where the softening point is too high for economical molding temperatures, or otherwise unsatisfactory, plasticizers may be used. Such plasticizers include the chlorinated biphenyls as the "Arochlors" of the Monsanto Chemical Company. Other conventional chlorinated plasticizers may likewise be used.

Molding pressures range from about 700 p. s. i. to about 3000 p. s. i. Preferably, however, molding pressures range from 1000 to 2000 p. s. i.

If desired, stable pigments may be used as desired to color the molded products. Fillers such as silica, titanium dioxide, mica, acid washed asbestos, and the like, may be used as desired. Fibrous fillers as asbestos impart increased strength to the molded products.

Example VIII

The product of Example I is molded into a small disc 2 inches in diameter and 1/16 inch thick at 250° C. and 2000 p. s. i. It has the following electrical properties at 23° C.:

| Frequency (C. P. S.) | Dielectric constant | Dielectric dissipation factor |
|---|---|---|
| $10^2$ | 2.05 | .0049 |
| $10^3$ | 2.03 | .0033 |
| $10^4$ | 2.02 | .0030 |
| $10^5$ | 2.02 | .0027 |

Comparable electrical properties are exhibited by moldings prepared from the poly-substituted polybenzenes of the other examples.

We claim as our invention:

1. A process for preparing polymers having reoccurring units of the structure

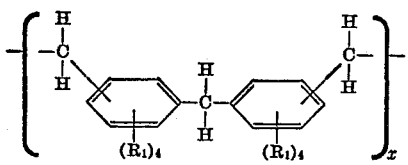

wherein the $R_1$'s are saturated aliphatic radicals of 1 to 4 carbon atoms per alkyl group and $x$ is greater than 1, which comprises reacting a bis(chloromethyl)tetra-alkyl benzene of 1 to 4 saturated aliphatic carbon atoms per alkyl group with a tetra-alkyl benzene of 1 to 4 saturated aliphatic carbon atoms, the process being conducted at a temperature ranging from 100° C. to 250° C. in the presence of an inert solvent boiling between 100° C. and 250° C., the reactants being present in a ratio of about 1:1.

2. The process of claim 1 in which the bis-(chloromethyl) tetra-alkyl benzene is bis-(chloromethyl)durene and the tetra-alkyl benzene is durene.

3. The process of claim 1 in which the bis-(chloromethyl)tetra-alkyl benzene is bis-(chloromethyl)trimethylethyl benzene and the tetra-alkyl benzene is durene.

References Cited in the file of this patent

UNITED STATES PATENTS

| | | |
|---|---|---|
| 2,719,131 | Hall | Sept. 27, 1955 |

FOREIGN PATENTS

| | | |
|---|---|---|
| 302,521 | Germany | Jan. 3, 1921 |
| 743,753 | France | Jan. 16, 1933 |
| 517,738 | Great Britain | Feb. 7, 1940 |

OTHER REFERENCES

Jacobson: J. Amer. Chem. Soc. 54, pp. 1513–18 (1932).

Rhoad et al.: J. Amer. Chem. Soc. 72, pp. 2216–19 (1950).

Farthing: J. Chem. Soc., 3270–77, October 1953.

Kaufman et al.: J. Polymer Sci., XIII, pages 3–20 (1954).